United States Patent [19]

Harney

[11] 4,221,849
[45] Sep. 9, 1980

[54] IRON-LITHIUM ANODE FOR THERMAL BATTERIES AND THERMAL BATTERIES MADE THEREFROM

[75] Inventor: David E. Harney, Sparks, Md.
[73] Assignee: Catalyst Research Corporation, Baltimore, Md.
[21] Appl. No.: 33,904
[22] Filed: Apr. 27, 1979
[51] Int. Cl.² ............................................. H01M 6/36
[52] U.S. Cl. .................................. 429/112; 429/218; 428/558
[58] Field of Search ............... 429/112, 101, 218, 221, 429/223; 428/558, 561, 562; 29/191.2

[56] References Cited
U.S. PATENT DOCUMENTS

| | | | |
|---|---|---|---|
| 4,013,818 | 3/1977 | Askew et al. | 429/112 |
| 4,048,395 | 9/1977 | Lai | 429/112 |
| 4,053,011 | 10/1977 | Riewald et al. | 428/558 X |

Primary Examiner—Anthony Skapars
Attorney, Agent, or Firm—Reed, Smith, Shaw & McClay

[57] ABSTRACT

The invention relates to an iron/lithium anode material for use in thermal batteries which comprises about 15% to 30% by weight lithium. Thermal batteries made from such anodes are also disclosed. The anode comprises particulate iron bound together by the surface tension of the lithium which wets the iron particles. A method is disclosed for the manufacture of the anode material which includes adding iron powder to a molten lithium and mixing to form a homogeneous mixture. The mixture is cooled to form an ingot and rolled into strips for fabrication into anode configurations.

12 Claims, 2 Drawing Figures

IRON-LITHIUM ANODE FOR THERMAL BATTERIES AND THERMAL BATTERIES MADE THEREFROM

FIELD OF THE INVENTION

The present invention relates to an anode material comprising iron-lithium for use in battery applications and, in particular, to an iron-lithium anode for use in lithium anode thermal batteries and to thermal batteries made therefrom.

BACKGROUND OF THE INVENTION

The present invention is an improvement in thermal batteries of the type disclosed and taught in U.S. Pat. Nos. 3,677,822, 3,425,872, 3,527,615, 3,367,800, 3,891,460, 3,930,888 and 4,119,769. Thermal batteries typically comprise a plurality of thermal cells each of which includes an anode, cathode, electrolyte and an integral igniteable heat source. The electrolyte is usually a eutectic mixture of LiCl and KCl and the cathode (depolarizer) comprises a material which is reduced in the electrochemical cell such as phosphates, metal oxides, borates and chromates. The most common depolarizer material is calcium chromate or vanadium pentoxide. Recently, a mixture of iron pyrite and binder have been shown to have significant advantages over conventional depolarizer materials, U.S. Pat. No. 4,119,769.

In the present state of the art thermal cells, the anode comprises a fusable metal normally selected from the group consisting of alkali metals, alkaline earth metals and alloys thereof which melt below the operating temperature of the battery. Of these, lithium and lithium alloys are preferred.

The anode, in practice, comprises a metal cup into which the active metal is positioned. Positioned adjacent to the active metal is an asbestos insulator or separator. The electrolyte, normally in the form of a wafer, is positioned adjacent to the separator in the cup. The depolarizer, preferably consisting of an analyte and catholyte layered wafer, is positioned in stacked array against the electrolyte.

Use of lithium in thermal batteries provides a number of advantages not the least of which is its capability of providing high current densities as a liquid metal anode. The reactive nature of lithium and its low melting point, however, have caused a number of associated difficulties, the most serious of which is leakage of the molten metal. Such leakage causes short circuits and premature failure in such batteries. An asbestos separator or other fibrous material is typically used to prevent or reduce such leakage by direct reaction with the molten metal, but such means occupy precious space and expose workers to asbestos material.

It is, therefore, an object of the present invention to provide an improved thermal anode which includes the advantages of lithium without its inherent disadvantages. It is a further object to provide an anode which results in a thermal cell having decreased weight and thickness by eliminating the need for asbestos or other separator materials. A yet further object is to achieve the aforementioned benefits and at the same time improve the electrical characteristics of the batteries.

DESCRIPTION OF THE INVENTION

The invention comprises a pyrometallurically combined iron/lithium anode. The ratio of lithium to iron is about 15% to 35% and preferably about 30% by weight. Preferably, the lithium is heated to about 500° to 600° F. and the iron added in particulate form while stirring the molten mixture. Preferably, the iron has a particle size of from about 1.3 to 2.1$\mu$ with a density of 0.2 to 0.8 gms/cc and a surface area of approximately 30 to 70 m$^2$/gm.

As the iron is added to the molten lithium the mixture becomes very viscous. Vigorous stirring is desired to wet the iron particles with the lithium. The mixture of lithium and wetted iron is preferably poured into a mold to cool. While only about 10% by volume of the material is lithium, the material retains the essential characteristics of lithium. It is easily rolled and shaped, and has reactivity essentially that of lithium. Unlike conventional thermal battery lithium anodes, the anode material of the present invention softens but does not liquify at normal battery operating temperatures. The anode thus maintains its dimensional stability during battery operation and does not flow as in conventional thermal batteries.

In the preferred range of lithium to iron described above, it is not believed to make a difference if there is no particle to particle contact between iron particles. In the present invention, the iron particles are held together by the surface tension of the lithium rather than being alloyed as is normally the case. Accordingly, it is contemplated that materials other than iron which are capable of being wetted by molten lithium, for example stainless steel, nickel and nichrome (to which lithium alloys slightly) are useful in the present invention.

In thermal battery application, the iron/lithium anode material of the present invention provides a number of advantages. In addition to affording an anode which is dimensionally stable during battery operation, a higher efficiency battery can be fabricated. Such efficiency results from being able to utilize more active material within a given volume by the elimination of the asbestos separator means. Elimination of the asbestos separator also provides a significant health advantage to employees making such batteries inasmuch as it does away with a possible carcinogen or cocarcinogenic material. When used in a thermal battery having a depolarizer of iron pyrite (U.S. Pat. No. 4,119,796) rather than chromates, a thermal battery can be manufactured having no suspected carcinogen or cocarcinogen present.

Better electrical parameters have been obtained using the iron/lithium anode material of the present invention. Basically, it is believed that such improvements are due to a more efficient utilization of lithium. Such improvements also result from the elimination of the asbestos separator which adds complexity to the design.

The above-described advantages result in an improved thermal battery as well as method for manufacture. However, other advantages will become apparent from a perusal of the following detailed description of the best mode contemplated for the use and manufacture of the iron/lithium anode of the present invention taken in connection with the accompanying drawings.

DESCRIPTION OF THE PREFERRED EMBODIMENT

Figure 1:
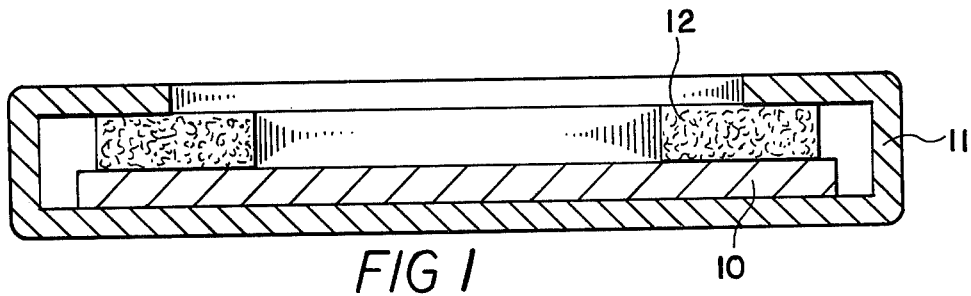
FIG. 1 is a sectional elevation of the iron/lithium anode positioned in a prior art cup conventionally used in thermal batteries.
Figure 2:
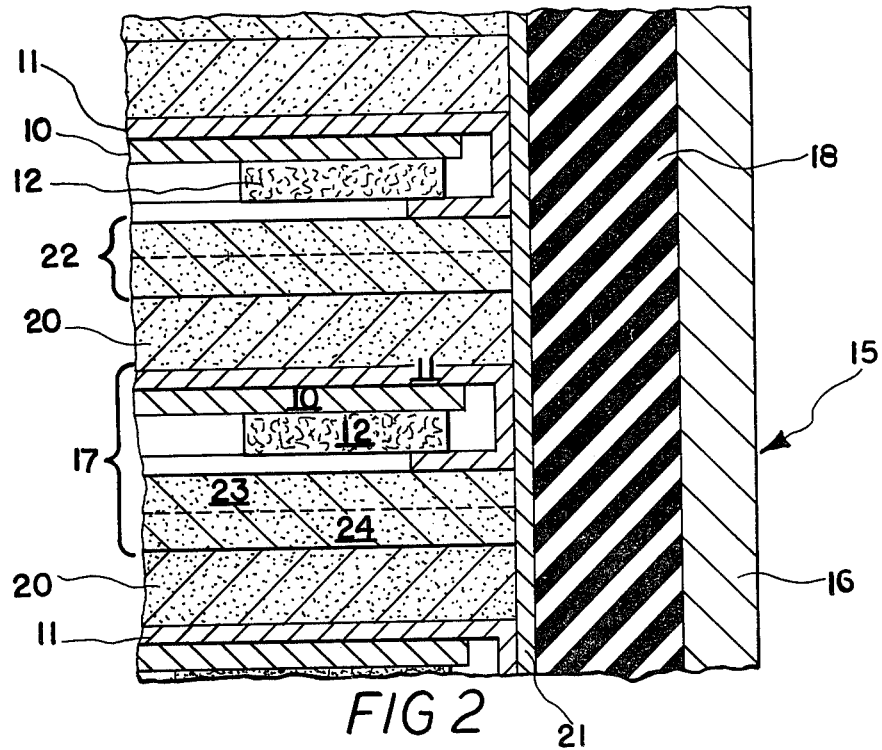
FIG. 2 is an enlarged breakaway sectional elevation of such iron/lithium anode positioned in a modified stack array for use in the battery disclosed in U.S. Pat. No. 4,119,796.

Preferably, the iron/lithium anode of the present invention is used in the thermal battery described in U.S. Pat. No. 4,119,796 incorporated by reference herein. With reference to FIG. 1, iron/lithium anode disc 10 is positioned in metal cup 11 by means of insulator ring 12, preferably made from Fiberfrax ®. A thermal battery 15 utilizing the iron/lithium anode of the present invention comprises a metal housing 16, usually in cylindrical configuration and a plurality of cells 17 in stacked array. Each cell comprises an anode cup 11 in which iron/lithium anode 10 is positioned. Between metal housing 16 and cells 17 is a layer 18 of thermal and electrical insulation. Positioned between each of the cells 17 is an ignitable chemical heat source 20 which is ignited by fuse strip 21 which in turn is connected to an electrical match or squib (not shown) to activate the battery.

As described above, the asbestos separators disclosed in U.S. Pat. No. 4,119,796 can be eliminated. However, the depolarizer binder (Cab-O-Sil ®) used in the preferred embodiment of the battery disclosed in that patent is not suitable for use with the anode material of the present invention. It has been found that $SiO_2$ reacts with the iron/lithium anode creating a self-discharge. Instead of a binder such as Cab-O-Sil ® it is desirable to use a material such as MgO as the depolarizer binder. In such case approximately 50% by weight of MgO is preferred rather than 15% by weight of Cab-O-Sil ® used in U.S. Pat. No. 4,119,796.

Also, it has been determined that it is preferable to use two layer anolyte-catholyte depolarizer 22 in each cell 17. The two layer depolarizer prevents the cell from short circuiting which has been found to be the case with homogeneous single layer depolarizer wafers when used without a separator with the anode material of the present invention.

Thermal batteries comprising a plurality of stacked cells as disclosed in U.S. Pat. No. 4,119,796 may thus be made using the iron/lithium anode by making the above modifications. The following examples are illustrative of the preferred method of making the anode material and the referenced modifications.

EXAMPLE 1

Method for Making Anode Strip 1640 grams of iron powder (apparent density 0.3 to 0.4 g/cc and Fisher sub-sieve size of 1.8 to 2.1 microns and having a surface area of about 50 m²/gm), 360 grams of lithium metal are weighed and placed in an argon purged glove box. The lithium is melted in a stainless steel crucible at 316° C. Approximately 700 to 800 grams of powdered iron are added to the molten lithium. The lithium is permitted to permeate the iron powder and mixed to obtain a homogeneous mass. The remaining iron powder is added and mixed until a homogeneous mass is obtained.

Thereafter the scrap anode strip is added to the homogeneous mixture and permitted to melt and mix therein. The materials balance comprises:

|  | Parts by weight |
|---|---|
| powdered iron | 82.0 |
| lithium metal | 18.0 |

The molten mixture is poured into a graphite or boron-nitride mold and permitted to cool. After the material has cooled it is removed from the mold as an ingot and stored in a sealed container of argon gas or in an atmosphere of less than 5% relative humidity until rolled into sheets or strips.

The chemical analysis of the resulting sheet in this example is:

| Iron | 82 ± 2% |
|---|---|
| Lithium | 18 ± 1% | with an apparent density of 2.0 to 2.5 g/cc.

EXAMPLE 2

A preferred method for making the anolyte and catholyte layer of the depolarizer for use in the battery disclosed in U.S. Pat. No. 4,119,769 with the anode material of Example 1 is described below:

Anolyte Layer 23

A mixture of LiCl (45%) and KCl (55%) eutectic is blended with magnesium oxide (calcine @ 600° C. for 4 hours) in a ratio of 1 to 1 and fused at a temperature of from 380° to 395° C. for about 16 hours. The fused material is granulated and seived <60 mesh screen. To the granulated powder is preferably added 2.5% by weight LiF which is mixed into the powder. The resulting mixture is placed in a press cavity together with the catholyte material and pressed into a wafer.

Catholyte Layer 24

The catholyte layer 24 comprises 25% (by wt.) electrolyte binder mix (LiCl-KCl eutectic) and 75% iron pyrite.

EXAMPLE 3

Thermal Battery

A thermal battery (A) was prepared in accordance with the disclosure of U.S. Pat. No. 4,119,769. A second battery 15 (B) was prepared in accordance with such disclosure, but modified in accordance with this disclosure using the iron/lithium anode material 10 prepared in accordance with Example 1 and the anolyte/catholyte depolarizer 22 material of Example 2.

Physical Dimensions

| Number of Cells = 28 | Load = 4 OHMS | | |
|---|---|---|---|
|  | WEIGHT (GMS) | HEIGHT (INS) | DIAM (INS) |
| Battery A | | | |
| Cell Assem | 8.08 | .09 | 1.73 |
| Stack | 265 | 2.49 | 1.73 |
| Battery | 439 | 2.89 | 2 |
| Cell Anode | .14 lithium | | |
|  | .48 iron substrate screen | | |
| Cathode | 1.01 | | |
| Asbestos | .87 | .022 | |
| Cup | 1.05 | | |
| Battery B | | | |
| Cell Assem | 7.65 | 0.7 | 1.73 |

-continued

| Number of Cells = 28 Load = 4 OHMS | | | |
|---|---|---|---|
| | WEIGHT (GMS) | HEIGHT (INS) | DIAM (INS) |
| Stack | 251 | 2.25 | 1.73 |
| Battery | 394 | 2.63 | 2 |
| Cell Anode | .18 lithium | | |
| | .72 iron | | |
| Cathode | 1.01 (50% MgO) | | |
| Cup | 1.05 | | |
| Fiber Ring (to position anode in cup) | | | |

Table I compares the voltages of Batteries A and B at various times after ignition. Not only does Battery B of the present invention have a higher peak voltage, but supplies its specified minimum voltage (38 volts) for a greater period of time.

TABLE 1

| A | | B | |
|---|---|---|---|
| SEC | VOLTS | SEC | VOLTS |
| 15 | 52.600 | 15 | 53.600 |
| 30 | 45.200 | 30 | 51.600 |
| 45 | 32.000 | 45 | 49.800 |
| 60 | 16.600 | 60 | 46.000 |
| | | 90 | 39.800 |
| | | 120 | 30.600 |

Tables II and III compare the electrical parameters of the Batteries A and B, respectively.

TABLE II

| Cutoff Volts | 48 | 38 (Specification) | 16.6 |
|---|---|---|---|
| Time, Seconds | 24.3243 | 38.1818 | 60 |
| Avg Volts | 51.7183 | 48.7893 | 41.1 |
| Avg Amps | 12.9296 | 12.1973 | 10.275 |
| Avg Amps/Sq In | 5.50051 | 5.18899 | .677535 |
| Watt-Hours | 4.51822 | 6.31165 | 7.03837 |
| Watt-Hrs/Lb | | | |
| Cell Assem | 9.05865 | 12.6543 | 14.1113 |
| Stack | 7.73369 | 10.8035 | 12.0474 |
| Battery | 4.6684 | 6.52144 | 7.27232 |
| Watt-Hrs/Cu In | | | |
| Cell Assem | .762755 | 1.06552 | 1.1882 |
| Stack | .771945 | 1.07836 | 1.20252 |
| Battery | .497645 | .695177 | .77522 |
| PCT Efficiency | | | |
| Anode | 20.5116 | 30.3736 | 40.2076 |
| Cathode | 19.3649 | 28.6755 | 37.9597 |

TABLE III

| Cutoff Volts | 48 | 38(specification) | 30.6 |
|---|---|---|---|
| Time, Seconds | 52.1053 | 95.8696 | 120 |
| Avg Volts | 51.8364 | 47.8497 | 45.125 |
| Avg Amps | 12.9591 | 11.9624 | 11.2813 |
| Avg Amps/Sq In | 5.51306 | 5.08906 | .743887 |
| Watt-Hours | 9.72273 | 15.2432 | 16.9689 |
| Watt-Hrs/Lb | | | |
| Cell Assem | 20.5889 | 32.2791 | 35.9335 |
| Stack | 17.5703 | 27.5466 | 30.6651 |
| Battery | 11.1933 | 17.5487 | 19.5354 |
| Watt-Hrs/Cu In | | | |
| Cell Assem | 2.11033 | 3.30855 | 3.68312 |
| Stack | 1.83833 | 2.88212 | 3.2084 |
| Battery | 1.17675 | 1.84489 | 2.05375 |
| PCT Efficiency | | | |
| Anode | 26.9743 | 45.8135 | 54.0795 |
| Cathode | 41.5763 | 70.6183 | 83.3544 |

What is claimed is:

1. A composite anode material for use in thermal batteries comprising lithium and a particulate metal capable of being wetted by molten lithium, but only slightly or not at all alloyable with said lithium, said particulate metal being present in amounts of from 70 to 85% by weight.

2. A composite anode material as set forth in claim 1 wherein said particulate metal is selected from the group consisting of iron, stainless steel, nickel and nichrome.

3. A composite anode material for use in thermal batteries comprising particulate iron and lithium, said particulate iron being present in an amount of from 70 to 85% by weight and being held together by the surface tension of said lithium.

4. A composite anode material as set forth in claim 3 wherein said iron has a particle size of from $1.3\mu$ to $2.1\mu$, and a surface area of from about 30 to 70 $m^2/gm$.

5. A composite anode material as set forth in claim 3 wherein said iron has a density of from 0.2 g/cc to 0.8 g/cc.

6. In thermal battery having a lithium anode electrolyte and a two-layer depolarizer, the improvement in said battery comprising a composite lithium anode consisting essentially of lithium and from 70 to 85% by weight particulate metal wettable by molten lithium, but only slightly or not at all alloyable with said lithium.

7. In a thermal battery as set forth in claim 6 wherein said particulate metal consists of iron having an apparent density of from 0.2 g/cc to 0.8 g/cc, and a surface area of about 50 $m^2/gm$.

8. In a thermal battery having a lithium anode, an eutectic salt electrolyte and a two-layer iron pyrite depolarizer, the improvement in said battery comprising:
   a. a composite lithium anode consisting essentially of lithium and from 70 to 85% particulate iron; and
   b. depolarizer binder comprising magnesium oxide.

9. A thermal primary battery comprising at least one cell including an anode comprising from about 70 to 85% by weight particulate iron bound together with lithium, a depolarizer comprising a first layer of fused eutectic electrolyte and a second layer comprising a homogeneous mixture of iron pyrite, said electrolyte and a binder; said first layer being positioned adjacent to said anode and a combustable heat generating means positioned adjacent to each of said cells.

10. A thermal battery as set forth in claim 9 wherein said binder comprises magnesium oxide.

11. A thermal battery as set forth in claim 10 wherein said iron has an apparent density of from 0.2 to 0.8 $gm/cm^2$, a particle size of $1.3\mu$ to $2.1\mu$ and a surface area of 30 to 70 $m^2/gm$.

12. A thermal battery as set forth in claim 11 wherein said density is 0.3 to 0.4 $gm/cm^2$, said particle size is $1.8\mu$ to $2.1\mu$ and the surface area is 50 $m^2/gm$.

* * * * *

UNITED STATES PATENT AND TRADEMARK OFFICE
CERTIFICATE OF CORRECTION

PATENT NO. : 4,221,849
DATED : September 9, 1980
INVENTOR(S) : David E. Harney

It is certified that error appears in the above-identified patent and that said Letters Patent are hereby corrected as shown below:

Column 2, line 44, after "No." delete "4,119,796" and substitute therefor -- 4,119,769 --;

Column 3, line 2, after "No." delete "4,119,796" and substitute therefor -- 4,119,769 --;

Column 3, line 8, after "No." delete "4,119,796" and substitute therefor -- 4,119,769 --;

Column 3, line 25, after "No." delete "4,119,796" and substitute therefor -- 4,119,769 --;

Column 3, line 33, after "No." delete "4,119,796" and substitute therefor -- 4,119,769 --;

Column 3, line 43, after "No." delete "4,119,796" and substitute therefor -- 4,119,769 --;

Signed and Sealed this

Twenty-fifth Day of November 1980

[SEAL]

Attest:

SIDNEY A. DIAMOND

Attesting Officer

Commissioner of Patents and Trademarks